(12) United States Patent
Hill et al.

(10) Patent No.: US 10,094,393 B2
(45) Date of Patent: Oct. 9, 2018

(54) MOUNTING SYSTEMS FOR GAS TURBINE ENGINES

(71) Applicant: United Technologies Corporation, Hartford, CT (US)

(72) Inventors: James D. Hill, Tolland, CT (US); Gabriel L. Suciu, Glastonbury, CT (US); Jesse M. Chandler, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 375 days.

(21) Appl. No.: 15/023,289

(22) PCT Filed: Aug. 1, 2014

(86) PCT No.: PCT/US2014/049365
§ 371 (c)(1),
(2) Date: Mar. 18, 2016

(87) PCT Pub. No.: WO2015/047539
PCT Pub. Date: Apr. 2, 2015

(65) Prior Publication Data
US 2016/0238032 A1    Aug. 18, 2016

Related U.S. Application Data

(60) Provisional application No. 61/883,853, filed on Sep. 27, 2013.

(51) Int. Cl.
*F01D 25/24* (2006.01)
*F04D 29/64* (2006.01)
(Continued)

(52) U.S. Cl.
CPC .......... *F04D 29/644* (2013.01); *B64D 27/26* (2013.01); *F01D 25/243* (2013.01); *F02C 7/20* (2013.01);
(Continued)

(58) Field of Classification Search
CPC .... F01D 25/243; F04D 29/324; F04D 29/522; F04D 29/644; F02C 7/20; B64D 27/26;
(Continued)

(56) References Cited

U.S. PATENT DOCUMENTS

| 6,607,165 B1 * | 8/2003 | Manteiga | B64D 27/18 244/54 |
| 6,843,449 B1 * | 1/2005 | Manteiga | B64D 27/26 244/54 |

(Continued)

FOREIGN PATENT DOCUMENTS

| EP | 0805108 A2 | 11/1997 |
| EP | 2080700 A2 | 7/2009 |
| EP | 2080879 A2 | 7/2009 |

OTHER PUBLICATIONS

European Search Report for Application No. EP 14 84 9046, dated Aug. 6, 2017.
(Continued)

*Primary Examiner* — Igor Kershteyn
(74) *Attorney, Agent, or Firm* — Cantor Colburn LLP

(57) ABSTRACT

A mounting system for a gas turbine engine includes a compressor case portion, an inlet frame, an outlet frame, and a mounting structure. The compressor case portion houses rotatable compressor blades. The inlet frame connects to an inlet end of the compressor case. The outlet frame connects to an outlet end of the compressor case portion at an end opposite the compressor case inlet end. An axially fore mounting structure of the mounting structure connects to the
(Continued)

inlet frame. An axially aft mounting structure of the mounting structure connects to the outlet frame. A bridging structure of the mounting structure is offset from the compressor case and connects the fore and aft mounting structures, thereby bridging engine loads across the inlet and outlet frames to reduce load induced distortion of the compressor case portion.

20 Claims, 5 Drawing Sheets

(51) Int. Cl.
*F04D 29/32* (2006.01)
*F04D 29/52* (2006.01)
*F02C 7/20* (2006.01)
*B64D 27/26* (2006.01)

(52) U.S. Cl.
CPC ......... *F04D 29/324* (2013.01); *F04D 29/522* (2013.01); *B64D 2027/264* (2013.01); *B64D 2027/266* (2013.01); *F05D 2220/32* (2013.01); *Y02T 50/44* (2013.01); *Y02T 50/671* (2013.01)

(58) Field of Classification Search
CPC ........ B64D 2027/264; B64D 2027/266; F05D 2220/32; Y02T 50/44; Y02T 50/671
See application file for complete search history.

(56) References Cited

U.S. PATENT DOCUMENTS

| | | | |
|---|---|---|---|
| 7,566,029 B2* | 7/2009 | Dron | B64D 27/26 244/54 |
| 8,042,342 B2* | 10/2011 | Diochon | B64D 27/26 244/54 |
| 8,322,651 B2* | 12/2012 | Levert | B64C 27/26 244/53 R |
| 8,322,652 B1* | 12/2012 | Stretton | B64D 27/26 244/54 |
| 8,328,132 B2* | 12/2012 | Marche | B64D 27/20 244/53 R |
| 8,640,987 B2* | 2/2014 | Journade | B64D 27/18 244/54 |
| 8,763,952 B2* | 7/2014 | Haramburu | B64D 27/26 244/54 |
| 2004/0245383 A1 | 12/2004 | Udall | |
| 2009/0183512 A1 | 7/2009 | Suciu et al. | |
| 2009/0184197 A1 | 7/2009 | Cloft | |
| 2012/0167592 A1 | 7/2012 | Suciu et al. | |
| 2012/0305700 A1* | 12/2012 | Stuart | F02C 7/20 244/54 |
| 2013/0052005 A1 | 2/2013 | Cloft | |

OTHER PUBLICATIONS

International Search Report for Application No. PCT/US2014/049365; dated Nov. 12, 2014.
Written Opinion for Application No. PCT/US2014/049365; dated Nov. 12, 2014.

* cited by examiner

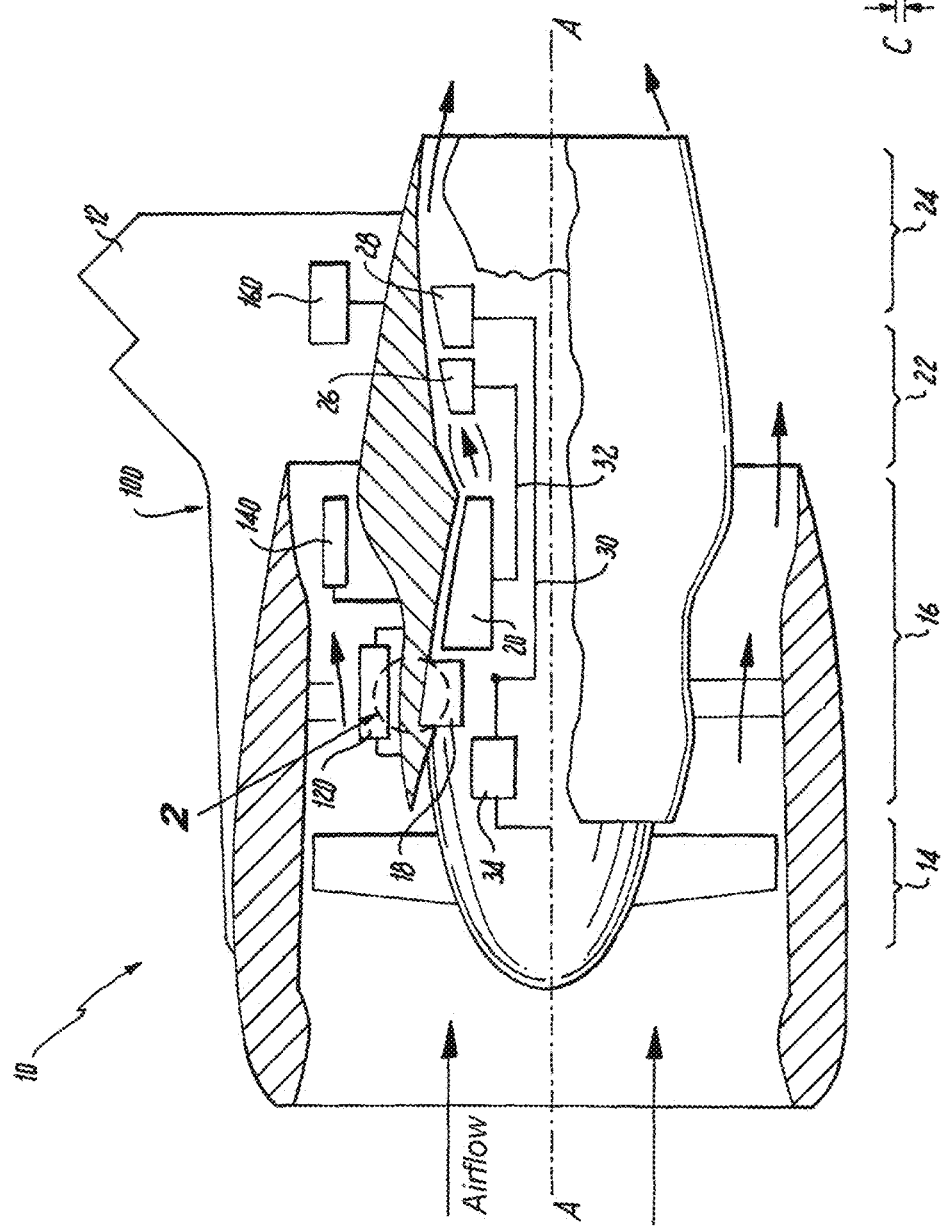
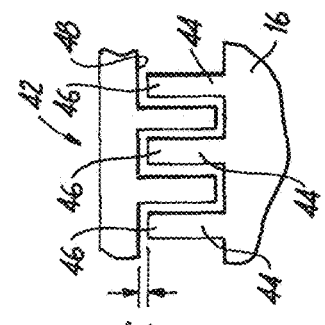

MOUNTING SYSTEMS FOR GAS TURBINE ENGINES

RELATED APPLICATIONS

This application claims the benefit of and priority to U.S. Provisional Patent Application No. 61/883,853 filed Sep. 27, 2013, the contents of which are incorporated herein by reference in their entirety.

BACKGROUND OF THE INVENTION

1. Field of the Invention

The present disclosure relates to gas turbine engines, and more particularly to mounting systems for connecting gas turbine engines to aircraft pylons.

2. Description of Related Art

Gas turbines engines typically mount to aircraft through pylons integrated into the aircraft structure using a mount assembly. The mount assembly connects the engine to the pylon and provides support to the engine by opposing vertical, lateral, and axial forces exerted by the engine by transmitting loads between the engine and the aircraft through the pylon.

The engine can exert a variety of loads on the mount assembly. For example, the engine exerts static loads associated with the mass of the engine in the vertical direction (i.e. loads directed upwards or downwards relative to normal orientation of an aircraft). The engine also exerts dynamic loads associated with engine operation, such as side loads (i.e. loads directed orthogonally with respect to an axis of rotation of the engine in an inboard or an outboard direction), torque loads (i.e. rotational loads directed about the axis of rotation of the gas turbine engine), and thrust loads (i.e. loads directed along the axis of rotation of the engine in either the forward or aft direction). The mount assembly exerts opposing forces in response to these loads, typically at locations where the mount assembly connects to the engine case.

One challenge with conventional mount assemblies is that the forces imposed by the mount assembly can deform the engine case. In configurations where a mount assembly connects to a case housing turbo machinery, such as a compressor case, deformation resulting from force transmitted through the mount assembly can alter tip clearances between stationary and rotating engine components within the engine (i.e. by making a circular case more oval in cross-sectional shape). In extreme circumstances, case deformation can also cause damage to internal engine components.

Conventional engine mount assemblies have generally been satisfactory for their intended purpose. However, there is a need for engine mounting assemblies that allow for efficient engine operation across a range of loading scenarios. There also remains a continuing need for engine mount assemblies that are lightweight and that are easy to make and use. The present disclosure provides solutions to these needs.

SUMMARY OF THE INVENTION

A mounting system for a gas turbine engine includes a compressor case portion, an inlet frame, an outlet frame, and a mounting structure. The compressor case portion houses rotatable compressor blades. The inlet frame connects to an inlet end of the compressor case. The outlet frame connects to an outlet end of the compressor case portion on an end opposite the case inlet end. An axially fore mounting structure of the mounting structure connects to the inlet frame. An axially aft mounting structure connects to the outlet frame. A bridging structure, offset from the compressor case, connects the fore and aft mounting structures and transfers engine loads across the inlet and outlet frames by bridging the compressor case to reduce load-induced distortion of the compressor case portion.

In certain embodiments, the bridging structure rigidly fixes the fore mounting structure to the aft mounting structure. The bridging structure can include a bridge beam connected between the fore and aft mounting structures. The bridging structure can also include an inboard bridge beam and an outboard bridge beam respectively connected between the fore and aft mounting structures.

In accordance with certain embodiments, a pylon hanger is axially disposed between the fore and aft mounting structures and connects to the inboard and outboard bridge beams. The pylon hanger can also be axially equidistant between the fore and aft mounting structures.

It is contemplated that aft mounting structure can include an inboard and an outboard clevis connecting the aft mounting structure to the outlet frame of the engine. Clevis pins can extend through the inboard and outboard clevises, connecting the aft mounting structure to the outlet frame of the engine. The clevis pins can extend in parallel to an axis defined by the mounting structure. The inboard clevis can connect to the outlet frame below and inboard of the inboard bridge beam, and the outboard clevis can connect to the outlet frame below and outboard of the outboard bridge beam.

A gas turbine engine is also provided. The engine includes a fan frame, compressor housing, a transition frame, and an engine mounting system. The compressor housing is connected on an aft end of the compressor housing. The transition frame is connected to an aft end of the compressor housing. A mounting structure as described above is included in the engine mounting system. The fore mounting structure is connected to the fan frame and the aft mounting structure is connected to the transition frame such that the bridge beam spans the compressor housing for controlling tip closure between turbo machinery housed within the compressor housing and interior surfaces of the compressor housing.

In certain embodiments, the mounting structure is a forward mounting structure and the engine mounting system further includes an intermediate mounting structure extending obliquely from the transition frame with respect to an axis of the engine. The engine mounting system can also include an aft mounting structure connected to a turbine housing connected aft-wise of the transition frame.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic cross-sectional side view of an exemplary embodiment of a mounting system for a gas turbine engine in accordance with the present disclosure, showing a gas turbine engine connected to an aircraft pylon frame by the mounting system;

FIG. 2 is a partial side cross-sectional view of a compressor of the gas turbine of FIG. 1, showing blade tips in proximity to an interior surface of the compressor case;

DETAILED DESCRIPTION OF THE PREFERRED EMBODIMENTS

Figure 3:
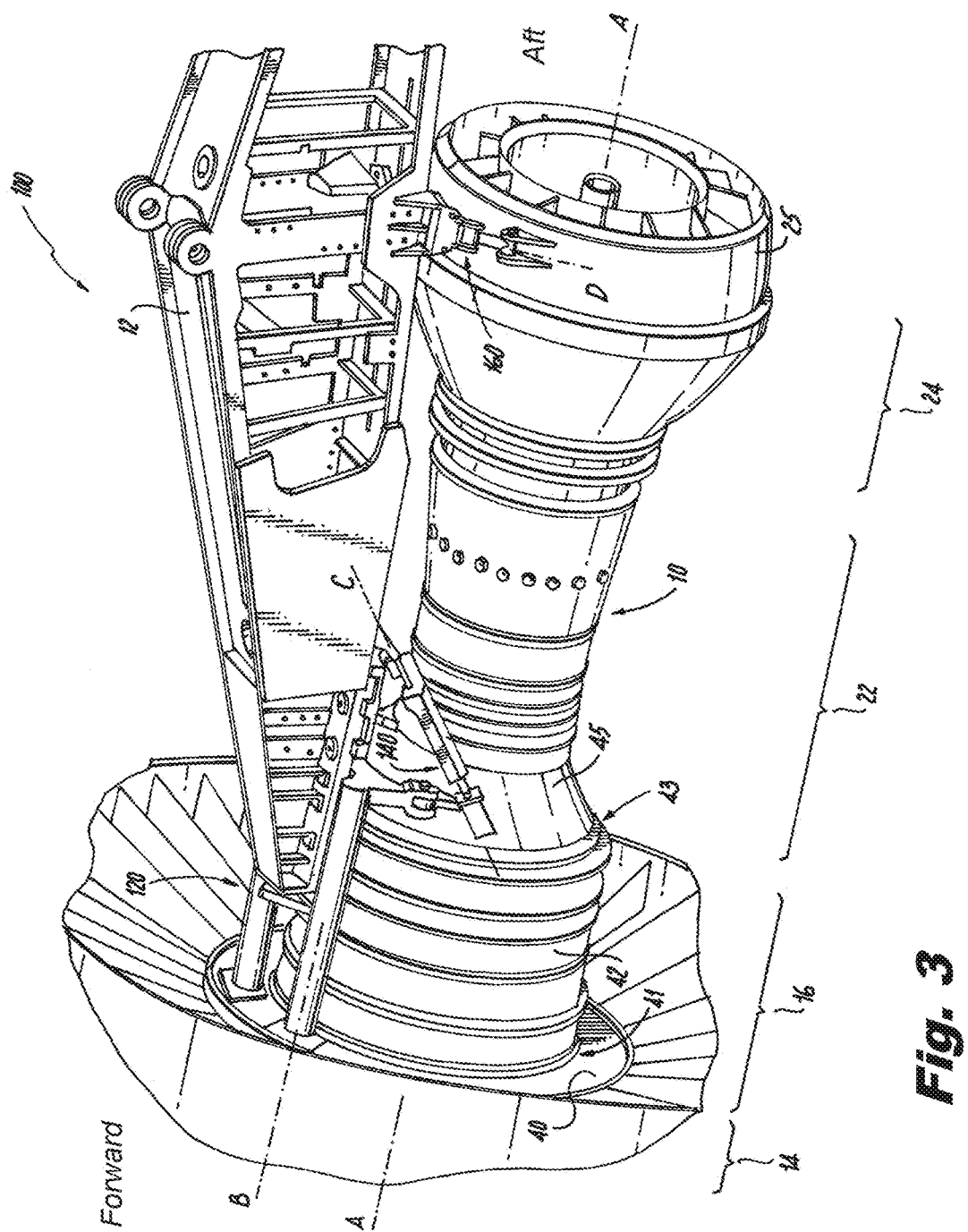
FIG. 3 is a side perspective view of the gas turbine engine and mounting system of FIG. 1, showing the mounting structures of the mounting system.

Reference will now be made to the drawings wherein like reference numerals identify similar structural features or aspects of the subject disclosure. For purposes of explanation and illustration, and not limitation, a partial view of an exemplary embodiment of a mounting system in accordance with the disclosure is shown in FIG. 1 and is designated generally by reference character 10. Other embodiments of engine mounting system in accordance with the disclosure, or aspects thereof, are provided in FIGS. 2 - 6, as will be described. The systems and methods described herein can be used for connecting gas turbine engines to aircraft, such as for mounting a high-bypass turbofan engines to an aircraft pylon frame for example.

With reference to FIG. 1, a gas turbine engine 10 is shown suspended from an aircraft pylon frame 12. The gas turbine engine 10 includes a fan section 14, a compressor section 16, a combustor section 22, and a turbine section 24. The compressor section 16 includes a low-pressure compressor 18 and a high-pressure compressor 20. The turbine section 24 includes a high-pressure turbine 26 and a low-pressure turbine 28. A low-speed shaft 30 rotationally supports low-pressure compressor 18 and low-pressure turbine 28. The low-speed shaft 30 also drives the fan section 14 either directly or indirectly, such as through a gear train 34. A high-speed shaft 32 rotationally supports the high-pressure compressor 20 and the high-pressure turbine 26. The low-speed shaft 30 and the high-speed shaft 32 rotate about a longitudinally extending engine axis A. The gas turbine engine 10 can be a high-bypass turbofan engine.

A mounting system 100 mounts the gas turbine engine 10 to the pylon frame 12. The mounting system 100 includes a mounting structure 120 spanning at least a portion of the compressor section 16. A spanned portion can include portions of either or both the high-pressure compressor 18 and the low-pressure compressor 20, and potentially controlling blade tip clearance throughout the spanned portion of the gas turbine engine 10. The mounting structure 120 is a forward mounting structure and the mounting system 100 additionally includes an intermediate mounting structure 140 and an aft mounting structure 160. The intermediate mounting structure 140 and the aft mounting structure 160 connect different portions of the gas turbine engine 10 to the pylon frame 12, as will be described.

The fan section 14 draws a flow of air into the gas turbine engine 10 that functions as working fluid. The compressor section 16 compresses the working fluid and supplies it to the combustion section 22. Fuel is added to the compressed working fluid in the combustion section 22 and ignited, further pressurizing the working fluid. The pressurized working fluid is supplied to the turbine section 24, which expands and extracts work from the working fluid. The turbine section 24 applies the extracted work to the low-speed shaft 32 and the high-speed shaft 30 for powering the components respectively attached to each shaft.

With reference to FIG. 2, a compressor case portion 42 is shown. The compressor case portion 42 is configured to house rotatable compressor blades 44, only three of which are shown for purposes of clarity. Rotation of rotatable components within the compressor section 16 causes blade tip portions 46 of the compressor blades 44 to rotate in proximity of an interior surface 48 of the compressor case 42. As will be appreciated by those skilled in the art, tip closure distance C for blades (only one of which is identified in FIG. 2 for clarity purposes) between the blade tip portions 46 and the interior surface 52 of compressor case 42 influence the operating efficiency of the gas turbine engine 10. It is desirable to control blade tip clearance C such that working fluid flows efficiently through the compressor section 16.

Loadings associated with the gas turbine engine 10 can distort the compressor case 42 such that the clearances C vary. This can reduce engine efficiency. It can also cause damage to engine components. Mounting system 100 transmits these loadings across the compressor section 16 and respective compressor cases and between engine structures that do not house rotating engine components, such as an inlet frame 40 and an outlet frame 45 (shown in FIG. 3). This reduces load applied to the compressor cases, reducing the likelihood of load-induced distortion to cases housing rotating engine components, and providing tip closure control. This can improve engine operational efficiency, such as by maintaining gas path dimensional control.

With reference to FIG. 3, the mounting system 100 is shown connecting the gas turbine engine 10 to the pylon frame 12 at connection points along the length of the gas turbine engine 10. With respect to its forward (inlet) end, the gas turbine engine 10 includes an inlet frame 40 connected to an inlet end 41 of the compressor case 42. An outlet frame 45 connected to an aft end of compressor case 42. Outlet frame 45 can be a transition frame housing a plenum fluidly coupling the low-pressure compressor 18 to the high-pressure compressor 20. A turbine housing 25 couples to an aft end of outlet frame 45. As will be appreciated by those skilled in the art, inlet frames 40 and outlet frame 45 can be structures configured and adapted for carrying larger loads than compressor case 42, potentially allowing the gas turbine engine 10 to be constructed from relatively lightweight case structures.

The forward mounting structure 120 connects to the gas turbine engine 10 at the inlet frame 40 on its forward end. Forward mounting structure 120 also connects to the gas turbine engine 10 at the transition (outlet) frame 45 on its aft end at an inboard connection point 138 and an outboard connection point 138 (each shown in FIG. 4). The forward mounting structure 120 defines a load axis B that is substantially parallel to axis A of the gas turbine engine. Since neither the inlet frame 40 nor the outlet frame 45 house turbo machinery such as rotating blades, deformation associated with loads transmitted through the mounting system 100 does not change blade tip clearances, and efficiency is unaffected by transmitting loads into the inlet frame 40 and the outlet frame 45.

The intermediate mounting structure 140 also connects to transition frame 45. The intermediate mounting structure 140 defines a load axis C that is oblique to transition frame 45, thereby transmitting axial loads between pylon frame 12 and transition frame 45. As illustrated, the intermediate mounting structure 140 connects at connection points disposed radially inboard and outboard with respect to the locations where the forward mounting structure 120 connects to the transition frame 45. For the same reasons discussed above, transmitting loads into the aft transition case 45 through the intermediate mounting structure 140 also not distort cases housing rotating components.

The aft mounting structure 160 connects to the turbine section 24 at inboard and outboard positions on the turbine case 25. The aft mounting structure 160 includes opposing links (only one shown in FIG. 3 for clarity purposes) that define load axes D substantially orthogonal with respect to the engine axis A and respectively laterally offset to inboard and outboard sides of the engine axis A.

Figure 4:
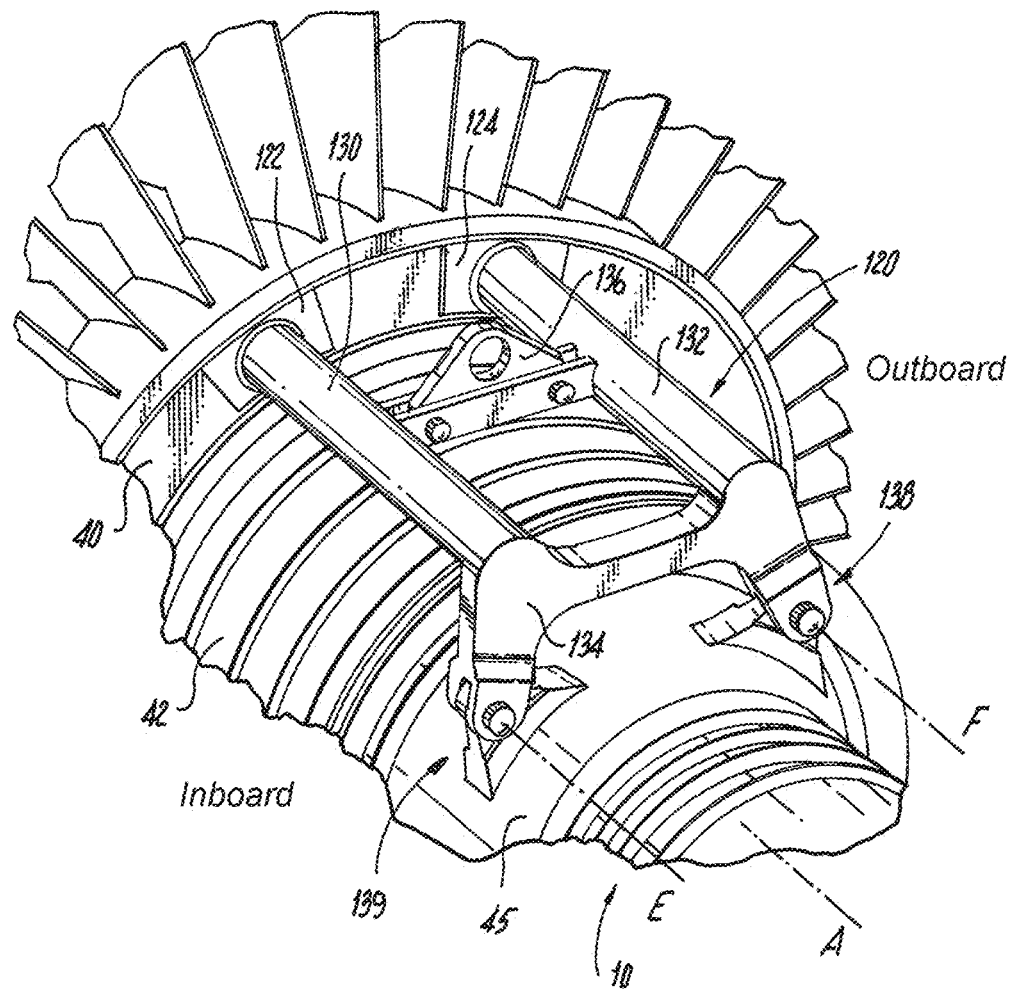
FIG. 4 is a top perspective view of the forward mounting structure of FIG. 1, showing the first and second bridge beams of the forward mounting structure.

With reference to FIG. 4, the forward mounting structure 120 is shown. The forward mounting structure 120 includes an axially fore mounting structure 122/124 connected to the inlet frame 40. As illustrated, the axially fore mounting structure 122/124 includes an inboard axially fore mounting structure 122 and an outboard axially fore mounting structure 124. Each of the inboard and outboard axially fore mounting structures 122 and 124 are rigidly connected to inlet frame 40, such as by welding, thereby forming an integral assembly including the forward mounting structure 100 and the inlet frame 40. The inboard and outboard axially fore mounting structures 122 and 124 also connect at an aft face of the inlet frame 40, providing advantageous load distribution of transmitted engine loads.

The forward mounting structure 120 also includes an axially aft mounting structure 134 and bridging structure 130/132. The axially aft mounting structure 134 is connected to outlet frame 45. Connection between the axially fore mounting structure 122/124 and axially aft mounting structure 134 is through the bridging structure 130/132. This distributes load exerted by the gas turbine engine 10 across the forward inlet frame 40 and aft transition (outlet) frame 45 symmetrically with respect to the engine axis A. As illustrated, bridging structure 130/132 includes a first bridge beam 130 and a second bridge beam 132 rigidly connected between the axially fore mounting structure 122/124 and the axially aft mounting structure 134.

The first and second bridge beams 130 and 132 are also parallel to one another, and with respect to an angle defined by axis A of the gas turbine engine 10, circumferentially offset from one another. Forward mounting structure 120 has one or more bridge beams axially offset from the engine axis A and configured to transmit loads between the pylon frame 12 and gas turbine 10 through the inlet frame 40 and the transition (outlet) frame 45. This prevents deformation of the compressor case 42 and provides for control of blade tip clearance with an interior surface of the compressor case 42.

With continued reference to FIG. 4, the forward mounting structure 120 additionally includes a pylon hanger 136. The pylon hanger 136 is axially disposed between the axially fore mounting structure 122/124 and the axially aft mounting structure 134. The pylon hanger 136 is also laterally connected on opposite ends to the first and second bridge beams 130 and 132. An aperture plate defined by the pylon hanger 136 connects the forward mounting structure 120 to pin on a forward face of the pylon frame 12. The pylon hanger 136 can be constructed from two components as illustrated in FIG. 4, or from a single integral component.

Constructing mounting structure 100 from two components allows for removal of the gas turbine engine 10 and the mounting structure 120 as a single assembly. As illustrated, the pylon hanger 136 is arranged substantially equidistant between the fore mounting structure 122/124 and the aft mounting structure 134. As will be appreciated by those skilled in the art, the intermediate hanger 136 can be positioned with at different distances between the forward and aft hangers as suitable for a given application of the mounting system 100 based on a center of gravity of the gas turbine engine 10.

The axially aft mounting structure 134 is formed as a lobed plate extending between aft ends of the first and second bridge beams 130 and 132. On a lower, outboard portion, the aft hanger 134 defines an outboard clevis and pin coupling 138. On a lower, inboard portion, the aft hanger 134 defines an inboard clevis and pin coupling 139. The pins of the inboard and the outboard couplings 138 and 139 define respective pin axes E and F that are parallel with respect to the engine axis A. The inboard and the outboard couplings 138 and 139 are also arranged below the first and the second bridge beams 130 and 132, thereby distributing a transmitted load circumferentially about transition (outlet) frame 45. This reduced peak stress and allows for construction of a relatively lightweight transition (outlet) frame 45.

Figure 5:
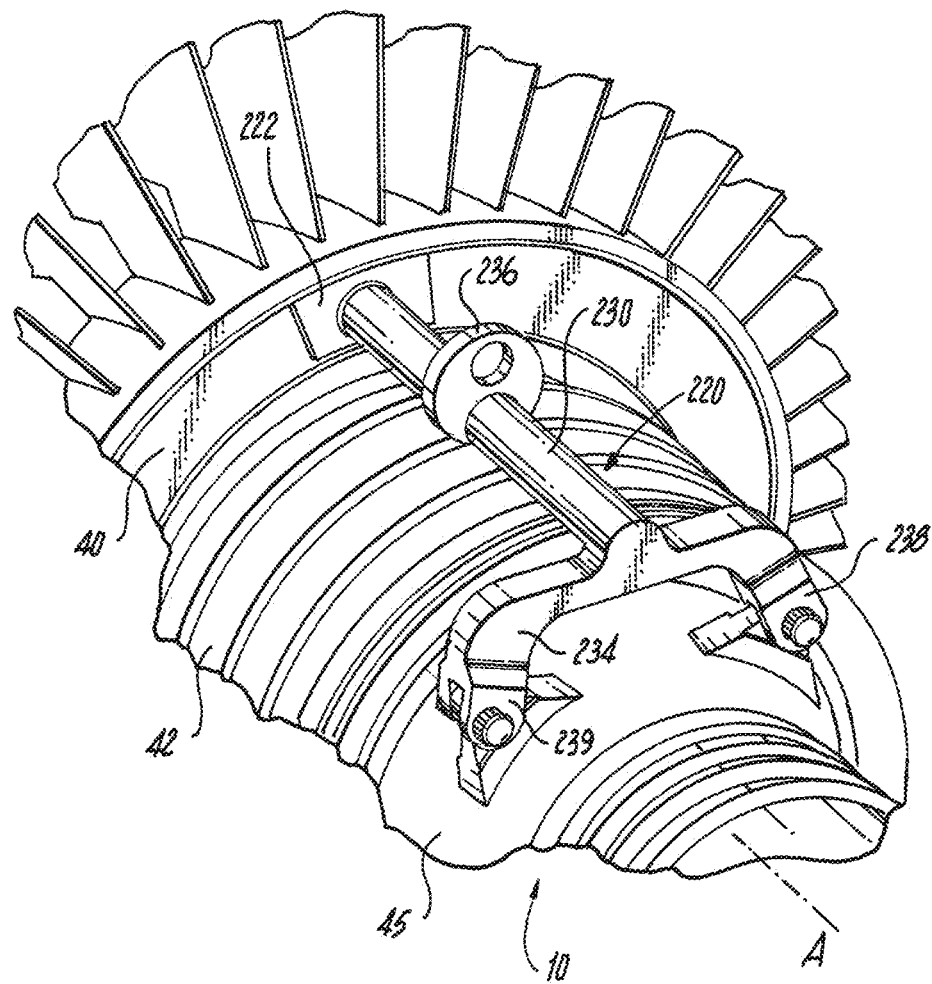
FIG. 5 is a top perspective view of another embodiment of a mounting structure, showing a single beam configuration of the forward mounting structure.

With reference to FIG. 5, a forward mounting structure 230 is shown. The forward mounting structure 230 is similar in construction to the forward mounting structure 130, and additionally includes a single bridge beam 232 and a single axially fore mounting structure 222. The single bridge beam 232 spans the compressor case 42 between the single axially fore mounting structure 222 and an axially aft mounting structure 234, connecting therebetween. A pylon hanger 236 is integrally coupled to the single bridge beam 232. Use of a single bridge beam instead of dual bridge beams offers potential weight savings in mounting systems employing such structures.

Figure 6:
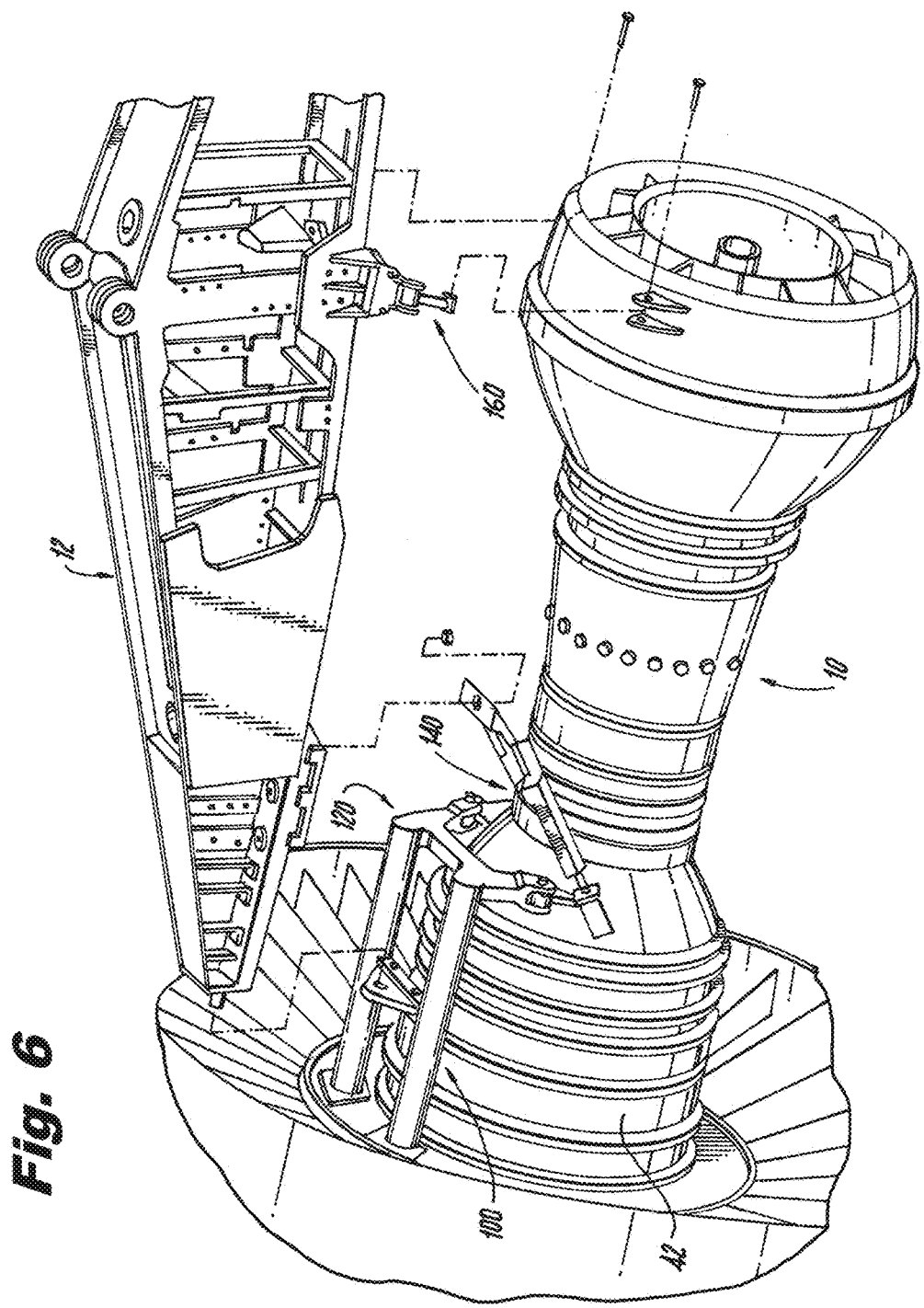
FIG. 6 is an exploded view of the engine and engine mounting system of FIG. 1, showing the mounting structure detached from the pylon frame.

With reference to FIG. 6, the gas turbine engine 10 is shown detached from the pylon frame 12. The forward mounting structure 120, rigidly fixed the gas turbine engine 10, remains coupled to the engine one detached to from the pylon frame 12. This provides a fixture for supporting the engine for shipment and/or for servicing the gas turbine engine 10 with positioning that transmits loads cross the compressor case 42, potentially preventing off-wing handling from adversely affecting engine efficiency.

Mounting system described herein allow for support of gas turbine engines at frame locations without rotating turbo machinery like blades. This reduces loading at cases housing rotating engine components like blades where case distortion resultant from engine loads can alter tip clearance. It potentially improves engine performance by controlling tip closure in the low-pressure compressor by sharing the load between the forward and aft frames. It also allows for reducing the size and weight of the frames. Mounting systems with split beams can potentially distribute, e.g. spread, engine load about the circumference of the frames, thereby reducing to tendency of the load to ovulate (e.g. deform from a round cross-sectional shape to an oval cross-sectional shape) the frames and case. Mounting systems described herein also can provide mounting with reduced case loading without altering configuration of the pylon frame.

The methods and systems of the present disclosure, as described above and shown in the drawings, provide for engine mounting systems and gas turbine engines with superior properties including more effective tip closure control within the compressor. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A mounting system for a gas turbine engine, comprising:
    a compressor case portion configured to house rotatable compressor blades;
    an inlet frame connected to an inlet end of the compressor case portion;
    an outlet frame connected to an outlet end of the compressor case portion opposed to the inlet end; and
    a mounting structure including:
        an axially fore mounting structure connected to the inlet frame;
        an axially aft mounting structure connected to the outlet frame; and
        a bridging structure connecting the fore and aft mounting structures, wherein the bridging structure is configured to bridge engine loads across the inlet and outlet frames and is offset from the compressor case, thereby reducing load induced distortion of said compressor case portion.

2. A mounting system as recited in claim 1, wherein the bridging structure rigidly fixes the fore mounting structure to the aft mounting structure.

3. A mounting system as recited in claim 1, wherein the bridging structure includes a bridge beam connected between the fore mounting structure and the aft mounting structure.

4. A mounting system as recited in claim 3, wherein the bridge beam is an inboard bridge beam and further including an outboard bridge beam connected between the fore mounting structure and the aft mounting structure.

5. A mounting system as recited in claim 4, further including a pylon hanger axially disposed between the fore mounting structure and the aft mounting structure, the pylon hanger being connected to the inboard and outboard bridge beams.

6. A mounting system as recited in claim 5, wherein the pylon hanger is axially arranged equidistantly between the fore mounting structure and aft mounting structure.

7. A mounting system as recited in claim 1, wherein the aft mounting structure includes an inboard clevis and an outboard clevis connecting the aft mounting structure to the outlet frame.

8. A mounting system as recited in claim 7, wherein the inboard clevis and the outboard clevis connect to the outlet frame with clevis pins extending parallel to an axis of the mounting structure.

9. A mounting system as recited in claim 7, wherein the inboard clevis connects to the outlet frame below and inboard of the inboard bridge beam.

10. A mounting system as recited in claim 7, wherein the outboard clevis connects to the outlet frame below and outboard of the outboard bridge beam.

11. A gas turbine engine, comprising:
    a fan frame;
    a compressor housing aft-wise and connected to the fan frame;
    a transition frame aft-wise and connected to the compressor housing; and
    an engine mounting system including:
        a mounting structure as recited in claim 1, wherein the fore mounting structure is connected to the fan frame and the aft mounting structure is connected to the transition frame such that the bridge beam spans the compressor housing for controlling tip closure between turbo machinery housed within the compressor housing and interior surfaces of the compressor housing.

12. A gas turbine engine as recited in claim 11, wherein the bridge beam is an inboard bridge beam and further including an outboard bridge beam connected between the fore mounting structure and the aft mounting structure.

13. A gas turbine engine as recited in claim 12, further including a pylon hanger axially disposed between connecting fore mounting structure and the aft mounting structure and connected to the inboard and outboard bridge beams.

14. A gas turbine engine as recited in claim 13, wherein the pylon hanger is axially arranged equidistantly between the fore mounting structure and aft mounting structure.

15. A gas turbine engine as recited in claim 11, wherein the aft mounting structure includes an inboard clevis and an outboard clevis connecting the aft mounting structure to the transition frame.

16. A gas turbine engine as recited in claim 15, wherein the inboard clevis and the outboard clevis connect to the transition frame with clevis pins extending parallel to an axis of the mounting structure.

17. A gas turbine engine as recited in claim 15, wherein the inboard clevis connects to the transition frame below and inboard of the inboard bridge beam.

18. A gas turbine engine as recited in claim 15, wherein the outboard clevis connects to the transition frame below and outboard with respect to the outboard bridge beam.

19. A gas turbine engine as recited in claim 11, wherein the mounting structure is a forward mounting structure and the gas turbine engine further includes an intermediate mounting structure connected to the transition frame and extending obliquely with respect to an axis of the engine.

20. A gas turbine engine as recited in claim 19, wherein the gas turbine engine further includes an aft-wise turbine housing connected to the transition frame, and wherein the engine mounting system further includes an aft mounting structure connected to the turbine housing.

* * * * *